United States Patent
Abidh et al.

(10) Patent No.: US 6,809,072 B2
(45) Date of Patent: Oct. 26, 2004

(54) WATER REPELLENT COMPOSITION AND WINDSCREEN WASHER COMPRISING A SILOXANE, ETHER ALCOHOL, AND CATIONIC SURFACTANT

(75) Inventors: Gerard Abidh, Roissy en Brie (FR); Laurent Levasseur, Chatenay Malabry (FR); Patrick Le, Decines (FR)

(73) Assignee: Deohn SA, Paris (FR)

( * ) Notice: Subject to any disclaimer, the term of this patent is extended or adjusted under 35 U.S.C. 154(b) by 177 days.

(21) Appl. No.: 10/282,475

(22) Filed: Oct. 29, 2002

(65) Prior Publication Data

US 2003/0110976 A1 Jun. 19, 2003

(30) Foreign Application Priority Data

Oct. 31, 2001 (FR) .............................. 01 14137

(51) Int. Cl.$^7$ ................................. C11D 1/00
(52) U.S. Cl. ................. 510/180; 510/163; 510/181; 510/182; 510/421; 510/432; 510/466; 510/504; 510/506
(58) Field of Search ................ 106/2, 13; 510/163, 510/180, 181, 182, 421, 432, 504, 466, 506

(56) References Cited

U.S. PATENT DOCUMENTS

| | | | |
|---|---|---|---|
| 5,314,533 A | | 5/1994 | Goebel et al. |
| 5,584,917 A | * | 12/1996 | Kijima et al. .................. 106/2 |
| 5,697,991 A | * | 12/1997 | Frazer ......................... 51/306 |
| 5,889,086 A | * | 3/1999 | Ushijima et al. ........... 523/169 |
| 6,461,537 B1 | * | 10/2002 | Turcotte et al. ............. 252/194 |

FOREIGN PATENT DOCUMENTS

| | | |
|---|---|---|
| EP | 0 331 833 A1 | 5/1988 |
| JP | 05329359 | 3/1991 |
| JP | 06313167 | 4/1993 |
| JP | 08073241 | 6/1995 |

\* cited by examiner

*Primary Examiner*—Charles Boyer
(74) *Attorney, Agent, or Firm*—Greenberg Traurig LLP; Eugene C. Rzucidlo

(57) ABSTRACT

The water-repellent composition, in particular for a windscreen washer liquid, comprises a compound of organopolysiloxane type as hydrophobic active agent and a solvent. According to the invention, the composition is used in combination with a solubilizing mixture comprising: at least one ether alcohol, as third solvent, one nonionic silicone surfactant and one cationic surfactant.

11 Claims, No Drawings

WATER REPELLENT COMPOSITION AND WINDSCREEN WASHER COMPRISING A SILOXANE, ETHER ALCOHOL, AND CATIONIC SURFACTANT

The present invention relates to the field of liquid substances of rain-repellent type intended to be applied to smooth surfaces and which have the role of preventing aqueous liquids from adhering thereto. It is targeted in particular at liquid substances applied to the windscreen of vehicles to prevent rainwater from interfering with vision.

Products with which glass surfaces are mainly treated to prevent water from adhering thereto are known. By rendering them hydrophobic, they prevent the formation of a continuous water film. The water which is propelled onto such a surface collects in the form of droplets. The latter are in an unstable position and are easily carried away due to their weight, if the surface is not horizontal, or due to the air in relative movement with respect to the surface. Thus, these products are of use when they are applied to the windscreen of vehicles. They make it possible to retain good vision through the latter in the event of rain. They are sometimes denoted by the term "rain repellent".

A water-repellent composition known from Patent FR 2 782 522 comprises:
  a hydrophobic active agent which is a compound of organopolysiloxane type and
  a solvent which is an organic compound from the family comprising alcohols, ketones, ethers, acetals and ether alcohols.

A specific active agent is a silicone fluid comprising a reactive amino functional group and in particular an aminoethylaminopropylpolysiloxane. The latter is available commercially under the name SF 1706 from General Electric Silicones.

The solvent is in particular propyl alcohol. These two components are in a proportion of 80 to 99% of solvent per 1 to 20% of hydrophobic agent. A commercial application, sold under the name Protène 53 by Atochem, comprises a 5% solution of aminoethylaminopropylpoly-siloxane in isopropanol.

The composition optionally comprises small amounts of additives which are usually encountered in rain-repellent products. For example, a perfume essence or a stabilizer can be added.

This composition exhibits all the properties usually required for a rain-repellent liquid: its refractive index is favourable, it is not aggressive with regard to the materials to which it may be applied, its toxicity is low and, finally, it exhibits good stability on storage, in particular in pressurized containers, this being the case over a wide temperature range extending from −55° C. to 80° C.

As is disclosed in Patent FR 2 782 522, one method of use of this water-repellent composition consists in spraying it in the form of an aerosol. It is packaged for this purpose in a receptacle pressurized with an inert gas, such as nitrogen. For its use, the product is sprayed over the surface to be treated and it is spread with a rag to obtain the rain-repellent effect.

As an alternative embodiment, the patent mentions the possibility of adding this composition to the product used as windscreen washer in motor vehicles. The windscreen washer product is itself predominantly composed of water.

It appears, however, that if more than 10% of water is added to the water-repellent composition, the water-repellent active agent separates from the remainder of the composition. An unusable emulsion is formed. This composition is in fact insoluble in non-alcoholic media.

The present invention is therefore targeted at solving this problem and has as subject-matter a rain-repellent water-repellent composition comprising at least one compound of organopolysiloxane type which can be added to an aqueous liquid without the risk of the formation of an emulsion. An alcohol-comprising aqueous liquid, such as a windscreen washer liquid, is targeted in particular.

This object is achieved with a composition comprising a compound of organopolysiloxane type as hydrophobic active agent and a solvent, characterized in that the composition is used in combination with a solubilizing mixture comprising:
  at least one third solvent composed of an ether alcohol,
  one nonionic silicone surfactant, such as a dimethylpolysiloxane modified with polyalkylene oxide, and
  one cationic surfactant.

A product exhibiting such a composition can be dissolved in water so as to form a preparation comprising more than 50% of water.

In accordance with another characteristic of the invention, the composition is characterized in that the ether alcohol is a propylene-based glycol ether with an ignition point of less than 100° C. In particular, it is monopropylene glycol monoethyl ether.

In accordance with another characteristic, the nonionic surface-active agent is a polysiloxane. In particular, it is a dimethylpolysiloxane modified with polyalkylene oxide.

In accordance with another characteristic, the cationic surface-active agent comprises quaternary ammonium. It also comprises cationic imidazoline.

Another subject-matter of the invention is a ready-to-use windscreen washer product comprising an alcohol or a mixture of alcohols with water. This product also comprises a composition according to at least one of the characteristics mentioned above.

In particular, such a windscreen washer product comprises
  from 0.01% to 10% of the said third solvent and preferably from 1 to 1.5%
  from 0.001% to 3% of the said nonionic surfactant
  from 0.005% to 0.5% of the said cationic surfactant
  from 0.01% to 1% of the hydrophobic agent
  from 1% to 50% of alcohol water, q.s. for 100%.

Another subject-matter of the invention is a process for the preparation of a windscreen washer product as described above, characterized in that the hydrophobic agent is mixed beforehand with the said alcohol or the said mixture of alcohols, the compounds of the said solubilizing mixture are subsequently added separately and the mixture is made up with water. Other agents can optionally be added.

An embodiment of the invention is described below in more detail.

A windscreen washer product conventionally comprises water, a mixture of alcohols, and additives. Depending on the product, it comprises from 50% to 100% of water, from 1% to 50% of alcohols and a small part of additives, less than 20%.

The mixture of alcohols is generally composed of isopropanol with ethanol in highly variable portions from 0 to 100%.

The optional additives are stabilizing, solubilizing and degreasing agents.

To associate a rain-repellent property with the above windscreen washer product, the dissolution is carried out therein in accordance with the invention of a water-repellent agent by means of a solubilizing mixture.

The hydrophobic agent is a compound of organopolysiloxane type. According to the preferred embodiment, it is an aminoethylaminopropylpolysiloxane sold by GE Silicones under the name SF 1706. The latter is sold as a 5% solution in isopropanol under the name Protène 53 by Atochem.

The solubilizing mixture comprises:

a) One or more cosolvants. They are of glycol ether type on a propylene base with an ignition point of less than 100° C. A preferred solvent is monopropylene glycol monoethyl ether. The amount is sufficient for the ready-to-use windscreen washer product to comprise from 0.01% to 10% thereof. Preferably, the concentration is between 1 and 5% thereof. This is because, below 1%, the solubilizing effect of the mixture is weaker and, above 10%, the treated window takes on a greasy appearance.

b) A silicone surface-active agent of polysiloxane type. The agent selected meets certain conditions. It is soluble in all proportions in an alcohol, such as isopropanol or ethanol. It also exhibits an ability to disperse or to dissolve in water. Copolymers based on ethylene oxide, which copolymers are alone or mixed, or copolymers based on ethylene oxide and on propylene oxide but not copolymers of propylene oxide, which copolymers are alone, meet these conditions. A specific product is a heptamethyltrisiloxane modified with polyalkylene oxide. It is sold commercially under the trade name Silwet L 77 by Witco.

The silicone surface-active agent is incorporated in the mixture in a sufficient amount for the windscreen washer product to comprise a proportion thereof of 0.001% to 3%. This is because a concentration ranging beyond 3% leads to a greasy effect on the treated surface.

c) A cationic surface-active agent. The latter comprises a combination of cationic surfactants comprising cationic imidazoline with $C_{20}$–$C_{22}$ carbon chains and quaternary ammonium, in the case in point dialkyldimethylammonium. These cationic surfactants are hydro-phobic and "solids-repellent", that is to say that they have a "dewetting" action targeted at driving water from the surface on which they are applied.

Use was made in particular of a product sold under the name Autopoon GK 4004 by Zschimmer and Schwartz.

The concentration in the final mixture remains less than 0.5%; beyond that, greasy deposits appear on the treated window surface. It is greater than 0.005%.

A windscreen washer product in accordance with the invention is prepared, the final composition of which is as follows.

| 1. | Mixture of alcohols ethanol and/or isopropanol | 29% |
|---|---|---|
| 2. | Protene PM 53 | 5% |
| 3. | Monopropylene glycol monoethyl ether | 1% |
| 4. | Silwet L 77 | 0.005% |
| 5. | Autopoon GK 4004 | 0.01% |
| 6. | Water | q.s. for 100% |

A first mixture 1–2 is prepared with the hydrophobic agent Protène PM 53 and the alcohols of the windscreen washer product. The isopropanol and the ethanol can be chosen in relative proportions ranging from 0 to 100%.

The hydrophobic agent is by nature completely soluble in the alcohols.

The compounds of the solubilizing mixture are subsequently incorporated separately in the first mixture 1–2, in the order 3, 4 and 5. After waiting approximately 10 minutes, the mixture is made up with water.

Optionally, during the preparation, an agent for improving the final appearance of the product is added.

The product thus prepared exists in the form of a clear deposit- and emulsion-free liquid.

It was applied to a windscreen via a windscreen washer device of a vehicle. The vision through the window is not affected by strong rain on the windscreen up to a speed of 50 km/h without the windscreen wipers having to be used.

A ready-to-use windscreen washer product has been disclosed. The invention also comprises the preparation of a windscreen washer product which has to be made up by incorporating water therein. The invention also comprises a rain-repellent mixture, composed of the hydrophobic agent and of the solubilizing mixture, which is ready to be diluted directly in water.

What is claimed is:

1. Rain-repellent water-repellent composition, capable of being incorporated in a windscreen washer liquid, comprising a compound of organo-polysiloxane as hydrophobic active agent and a solvent, characterized in that the composition is used in combination with a solubilizing mixture comprising: at least one ether alcohol, one nonionic silicone surfactant and one cationic surfactant.

2. Composition according to the preceding claim 1 characterized in that the ether alcohol is a propylene-based glycol ether with an ignition point of less than 100° C.

3. Composition according to the preceding claim 2 characterized in that the glycol ether is monopropylene glycol monoethyl ether.

4. Composition according to claim 1, characterized in that the nonionic surfactant is a polysiloxane.

5. Composition according to claim 4, characterized in that the nonionic surfactant is a dimethylpolysiloxane modified with polyalkylene oxide.

6. Composition according to claim 1, characterized in that the cationic surfactant comprises quaternary ammonium.

7. Composition according to the preceding claim 6 characterized in that the cationic surfactant comprises cationic imidazoline.

8. Composition according to claim 1 characterized in that the compound of organopolysiloxane is an aminoethylaminopropylpolysiloxane.

9. Windscreen washer composition comprising water and at least one alcohol, characterized in that it also comprises a composition according to claim 1.

10. Composition according to claim 9, characterized in that it comprises:

from 0.01% to 10% of the said ether alcohol and preferably from 1 to 1.5%, from 0.001% to 3% of the said nonionic surfactant, from 0.005% to 0.5% of the said cationic surfactant, from 0.01% to 1% of the hydrophobic agent, from 1% to 50% of alcohol.

11. Process for the preparation of a windscreen washer composition according to claim 1 characterized in that it comprises the following stages:

a composition comprising the said compound of organopolysiloxane in solution in a solvent is introduced into an alcohol or a mixture of alcohols, the compounds of the said solubilizing mixture are added, the mixture is made up with water.

* * * * *